United States Patent [19]

Blank

[11] 3,959,202

[45] May 25, 1976

[54] COMPOSITION OF MATTER COMPRISING A BLEND OF CERTAIN POLYETHER POLYOLS, CERTAIN VINYL EMULSION POLYMERS AND AN AMINOPLAST CROSS-LINKING AGENT

[75] Inventor: Werner Josef Blank, Wilton, Conn.

[73] Assignee: American Cyanamid Company, Stamford, Conn.

[22] Filed: Sept. 8, 1975

[21] Appl. No.: 611,093

Related U.S. Application Data

[63] Continuation-in-part of Ser. No. 460,416, April 12, 1974, which is a continuation-in-part of Ser. No. 331,406, Feb. 12, 1973, abandoned.

[52] U.S. Cl. .................. 260/29.4 UA; 260/29.3; 260/33.2 R; 260/839; 260/840; 260/851; 260/856; 427/388; 428/460; 428/463

[51] Int. Cl.² .......................................... C08L 61/28

[58] Field of Search .......... 260/29.4 UA, 29.3, 849, 260/851, 856, 839, 840

[56] References Cited

UNITED STATES PATENTS

| | | | |
|---|---|---|---|
| 3,267,174 | 8/1966 | Fry et al. | 260/851 |
| 3,352,806 | 11/1967 | Hicks | 260/851 |
| 3,352,838 | 11/1967 | Toepfl et al. | 260/851 |
| 3,382,294 | 5/1968 | Christenson | 260/851 |
| 3,428,479 | 2/1969 | Dobransky | 260/851 |
| 3,523,093 | 8/1970 | Stamberger | 260/849 |
| 3,598,770 | 8/1971 | Moore et al. | 260/851 |

*Primary Examiner*—John C. Bleutge
*Attorney, Agent, or Firm*—James T. Dunn

[57] ABSTRACT

A composition of matter comprising a blend of certain proportions of a non-ionic, water-dilutable polyether polyol resin, certain proportions of a vinyl emulsion polymer having certain functional reactive groups and certain proportions of a compatible aminoplast cross-linking agent.

11 Claims, No Drawings

COMPOSITION OF MATTER COMPRISING A BLEND OF CERTAIN POLYETHER POLYOLS, CERTAIN VINYL EMULSION POLYMERS AND AN AMINOPLAST CROSS-LINKING AGENT

REFERENCE TO RELATED APPLICATIONS

The present application is a continuation-in-part of my U.S. Pat. application, Ser. No. 460,416, filed Apr. 12, 1974, (Attorney's Docket No. 25,274), which is a continuation-in-part of my earlier application, Ser. No. 331,406, filed Feb. 12, 1973, now abandoned but refiled as Ser. No. 530,459, filed Dec. 6, 1974.

BACKGROUND OF THE INVENTION

Blends of esinous materials have been manufactured and sold for a substantial plurality of years. Emulsion vinyl polymers are also well known polymeric materials. These emulsion products are known for their excellent performance and have been utilized in house-paint applications by brushing. The industrial baking application of emulsion by spray, roller coating or dipping applications has found a strong resistance to use because of disculties in handling the emulsions. The generally recognized problems, in using emulsions, are skin formation during storage, coagulation or freezing at low temperatures, mud cracking during applications, poor flow out of sprayed coatings and low gloss coatings, plugging of the spray gun, drying on application rolls, and difficulties in cleaning equipment. These difficulties have to be overcome in order to utilize the excellent performance of a coating obtained fromm an emulsion system. It is known that the addition of volatile organic solvent can overcome some of these problems, and organic solvents such as the glycols, glycol ethers and high boling alcohols are presently being used to overcome these problems. Although acceptable and necessary in a number of these applications, these organic volatile cosolvents create a number of seriou application problems. Being volatile, these organic solvents and cosolvents create odor, pollution and toxicity problems. The amount which can be added to the emulsion is also limited to the extent that these solvents create flammability and stability problems.

THE FIELD OF THE INVENTION

The present invention is in the field of blends of polymeric materials that are particularly useful in the coating field as well as in the manufacture of low pressure laminates, adhesives, molding compounds and textile treating resins. The compositions of the present invention are comprised of a blend of certain polyether polyol resins, certain aqueous vinyl oil-in-water emulsion polymers and certain cross-linking agents which can be applied as a coating from an aqueous medium without the shortcomings referred to hereinabove. The polyether polyols used in the composition of the present invention are compatible with a broad range of vinyl emulsion polymers to the extent that the polyether polyol can fulfill the function of the organic cosolvent without the inherent problems of an organic solvent such as volatility and toxicity. The use of the polyether polyols of the present invention can increase the application solids of the emulsion, eliminate freezing of the emulsion, eliminate mud cracking of the emulsion, increase flow, reduce skin formation, increase gloss and improve the application characteristics of the emulsion. On the other end of the spectrum, it has been observed that the addition of small levels of emulsion to the polyether polyols of the present invention can significantly increase the water-resistance of a deposited film. With most formulations, the blends of the polyether polyol with the vinyl emulsion polymer have better overall performance than any of the components taken separately.

SUMMARY OF THE INVENTION

This invention relates to a composition of matter comprising a blend of (A), from about 3% to about 98%, by weight, of a non-ionic, water-dilutable, polyether polyol resin having an average molecular weight not greater than about 2,000, having at least two alcoholic hydroxy groups, having from about 80% to abot 10%, by weight, of hydrophobic moieties and correspondingly from about 20% to about 90%, by weight, of hydrophilic moieties, (B), correspondingly from about 97% to about 2%, by weight, solids basis, of an aqueous vinyl emulsion polymer having a particle size between about 600 A and 50,000 A, containing from about 1% to about 10%, by weight, of functional reactive groups selected from the group consisting of hydroxy, carboxyl, amide, keto, methylol and alkoxymethyl groups, and (C) from about 10% to about 85% by weight, based on the total weight of (A) and (B) of a compatible aminoplast cross-linking agent having an average molecular weight not greater than about 1,500.

As used herein, the term moiety refers to one of the portions into which the polyether polyol resin is divided. These portions may be equal but are not necessarily equal.

DESCRIPTION OF THE PREFERRED EMBODIMENTS

The compositions of the present invention are composed of three (3) essential components. The first comonent is a non-ionic polyether polyol resin containing only carbon, hydrogen, and oxygen atoms and optionally a halogen atom having at least 2 alcoholic hydroxy groups and having a plurality of hydrophobic moieties and a plurality of hydrophylic moieties. These polyols may be prepared, for instance, by reacting a compound containing a plurality of hydroxy groups with an alkylene oxide. These compounds containing a plurality of hydroxy groups may be aromatic compounds or cycloaliphatic compounds. These polyhyric compounds may be monomeric or part of a low molecular weight polymer chain such as a polymer of phenol-formaldehyde reaction product, many of which are well known such as the Novolak resin type. Among the monomeric compounds that can be used to make the polyether polyol resin used in the present invention are the bisphenol compounds such as bispheonol A which is identified as 4,4'-isopropylidene diphenl which is also known as 4,4'-dihydroxdiphenyldimethylmethane. Another bisphenol is identified as bisphenol F which is 4,4'-methylene diphenol which is also known as 4,4'-dihyroxydiphenylmethane. Other polyhydric phenols which can be used in preparing the non-ionic polyether polyol resins used in the present invention are the dihydric phenols represented by the general formula:

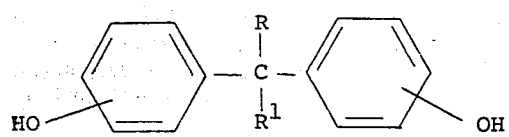

wherein the phenolic hydroxy groups may be in one of the 2,2'; 2,3'; 2,4'; 3,3'; 3,4'; or 4,4' positions on the aromatic nuclei, and each of R and R¹ represent hydrogen, an lkyl group, such as methyl, ethyl, propyl, isopropyl, butyl, sec-butyl, pentyl, iso-pentyl, hexyl, iso-hexyl, and the like; a cyclo(lower)alkyl group, such as cyclohexyl or substituted cyclohexyl group, e.g., methyl-, ethyl-, propyl-, butyl-, pentyl- and hexyl-substituted cyclohexyl, or an aromatic group, such as phenyl, tolyl, xylyl, and the like. In addition, the phenolic rings may have other substituents besides the hydroxyl group, for example, lower alkyl groups containing from 1 to 4 carbon atoms, i.e., methyl, ethyl, propyl, isopropyl, butyl, secbutyl and tert.-butyl groups, halogen atoms, i.e., fluorine, chlorine, bromine or iodine and the An illustrative but, by no means exhaustive listing of dihydric phenols falling within this general formula includes 4,4'-dihydroxydiphenylmethylmethane (bisphenol A), 2,4'-dihydroxydiphenylethylmethane, 3,3'-dihydroxydiphenyldietylmethan 3,4'-dihydoxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2-dihydroxydiphenylditolylmethane, 4,4'-dihydroxydiphenyltolymethylmethane, and the like.

Among the alkylene oxides that may be reacted with the polyhydric compounds such as those set foth hereinabove are ethylene oxide, propylene oxide, butylene oxide and olefine oxides with a chain length of $C_5$–$C_{18}$, styrene oxide, 4-oxatetracyclo-[6.2.1.0²,7,0³,5] undecan-9(10)-ol and similar mono epoxy compounds derived from aliphatic, cycloalyphatic and aromatic hydrocarbons. With the exception of ethylene oxide all other alkylene oxide compounds immpart hydrophobic moieties to the polyol.

Illustrative of the polyether polyols which may be used as a component in the compositions of the present invention are the following:

These illustrations show the preparation of specific polyether polyols. These examples are set forth primarily for the purposes of illustration and any specific enumeration of details contained therein should not be interpreted as a limitation on the case except as is indicated in the appended claims. In these examples all parts are parts by weight unless otherwise indicated. Certan of the polyethers set forth hereinbelow are commercially available. These polyethers are prepared according to the method set forth in each of the illustrative examples utilizing the reactants recited and the polyethers have the properties also described.

Polyether A is prepared by reacting 1 mol of bisphenol F (4,4'-methylene diphenol) with 2 mols of propylene oxide. The reaction product thus produced is then reacted with 7 mold of ethylene oxide. The resulting product has a viscosity of 1,650 centipoises and a hydroxyl number of 225. The molecular weight of the product is about 500. This product has about 49% hydrophilic moieties and about 51% hydrophobic moietis. Polyether A is a liquid.

Polyether B is prepared by reacting 3 mols of phenol under acidic conditions with 2 mols of formaldehyde. The resulting product is then reacted with 9 mols of ethylene oxide. The resulting polyether has a viscosity of 11,700 centipoises, a hydroxyl number of 244 and a functionality of b 3. Polyether B has a molecular weight of about 680. This product has about 56% hydrophilic moieties and about 44% hydropholic moieties. Polyether B is a liquid.

Polyether C is prepared by reacting 1 mol of the phenol formaldehyde reaction product of polyethe B in sequence with 3 mols of ethylene oxide and then with 3 mols of propylene oxide. The resulting polyether has a viscosity of 132,000 centipoises and a hydroxyl number of 291. The molecular weight is about 570. This product has about 22% of hydrophilic moieties and about 78% hydrophobic moieties. Polyether C is a liquid.

Polyether D is prepared by reacting 1 mol of bisphenol A (4,4'-isopropylidene diphenol) with 6 mols of ethylene oxide. The resulting product has a viscosity of 2,840 centipoises and a hydroxyl number of 215. The molecular weight of polyether D is about 520. This product has about 54% hydrophilic moieties and about 46% hydrophobic moieties. Polyether D is a liquid.

Polyether E is prepared by reacting 1 mol of hydrogenated bisphenol A with 10 mols of ethylene oxide. The product has a molecular weight of 601, an hydroxyl number of 158 and is a solid. The polyether contains about 65% hydrophilic moieties and 35% hydrophobic moieties.

Polyether F is prepared by reacting 1 mol of bisphenol A with 10 mols of ethylene oxide to produce a liquid product having a molecular weight of 679. The hydroxyl number is 154. Polyether E contains about 66% of hydrophilic groups and 34% of hydrophobic groups.

Polyether G is prepared by reacting 1 mol of bisphenol A with about 21 mols of ethylene oxide to produce a waxy solid having a molecular weight of about 1150 and an hydroxyl number of 98. The polyether contains about 80% of hydrophilic group and about 20% of hydrophobic groups. This polyether is soluble in water.

Polyether H is prepared by reacting 1 mol of polyether E with 12.5 mols of ethylene oxide to produce a hard waxy solid having a molecular weight of 1,300, an hydroxyl number of 88, and contains about 80% of hydrophilic ethylene oxide moieties and about 20% hydrophobic moieties.

Polyether I is prepared by reacting 1 mol of bisphenol A with 6 mols of propylene oxide and 12 mls of ethylene oxide. The resulting product hs a hydroxyl number 100 and molecular weight about 1,140. This product has 47.8% hydropholic moieties and 2.2% hydropholic moieties. This polyether is normally liquid.

The amount of the non-ionic poletherpolyol resins used as component (A) in the compositions of the present invention may be varied between 3% to about 98%, by weight, based on the total weight of the polyether polyol resin and the aqueous vinyl emulsion polymer solids. These polyether polyols should have an averge molecular weight between about 300 and about 2,000. By the same token, (B), the aqueous vinyl emulsion polymer, used with the polyether polyol resin is present in an amount correspondingly from about 97% to about 2%, by weight, solids basis based on the total weight of (A) and (B) to be used. Whatever the percentages used, the total percent of the two components will e 100%.

In addition to the polyether polyols made by simple grafting of alkylene oxides to diphenolic (or polyphenolic) materials, more complex structures can also be used. For example higher molecular weight materials may be made by forming dimers or oligomers of the low molecular weight polyols by reaction with difunctional hydroxy reactive materials. Examples of difunctional reactive materials are diepoxides such as diglycidyl ether and bisphenol A diglycidyl ether or epihalohydrin such s epichlorohydrin. To obtain material with an average of two polyols units per molecule, about two mols of th difunctional polyol should be reacted with about one mol of the difunctional coupling agent. Since these coupling reagents are materials with widely different hydropholic/hydrophilic characteristics the selection of the most suitable one will require consideration of the hydrophobic/hydrophilic balance of the polyether polyol involved and the end properties desired.

It is also feasible to increase the size of the hydropholic unit by coupling two or more hydropholic diphenolic or hydrogenated diphenolic structures with a difunctional reactive material such as epihalohydrin or a diepoxide. The difunctional component contributes in each case to the hydrophobic characteristics of the polyol. This means that the hydrophobic/hydrophilic balance of a difunctional reaction product and a polyether polyol is shifted to the hydrophobic side. An increase in the polyethylene glycol content of the polyether polyol can be used to achieve a reaction product with the difunctional compound which is less hydrophobic.

Another class of polyether/polyols which is useful is those in which the aromatic residues have been saturated by hydrogenation either before or after the grafting reaction with the alkylene oxide. Such components have a similar combination of rigid and flexible blocks but since they are saturated, they have reduced sensitivity to ultraviolet radiation. The sensitivity of many aromatic phenol deriatives to ultraviolet radiation is well known.

The aqueous vinyl emulsion polymer used as the component (B) in the compositions of the present invention should have a particle size between about 600 A and 50,000 A contaning about 1% to 10%, by weight, of one or more functional groups selected from the group consisting of hydroxyl, carboxyl, amide, keto, methylol and alkoxymethl. These functional reactive groups are reacted with the cross-linking agent but in some instances such as in the alkoxymethyl group it is self reactive. The remainder of the vinyl emulsion polymer can consist of an alkyl ster of an $\alpha,\beta$-ethylenically unsaturated acid, a vinyl ester, a vinyl ether, styrene or ring or side chain substituted stryenes, acrylonitrile or substituted acrylonitriles, vinyl chloride, vinylidene chloride and the like. Obviously, these additional vinyl monomers can be used singly or in combination with one another, in combination with those vinyl monomers having the aforementioned functional reactive groups. The preparation of the emulsion polymer is conventional and the selected monomers are introduced into the water to form an oil-in-water emulsion utilizing an emulsifying agent and an appropriate catalyst which may be a peroxide catalyst or redox catalyst. In these emulsions the water is the continuous phase and is replaced with the polyether polyol upon blending the two essential components. The vinyl emulsion polymer, dispersed in the aqueous medium, can be added directly to the polyether polyol and such technique is preferred. On the other hand, the selected monomrs can be polymerized in an oil-inwater system and the water removed from the polymeric material and the thus prepared polymeric material can then be dissolved or dispersed in the polyether polyol.

The monomers of the emulsion polymer of the present invention will depend on the final end application and the performance required from the coating system. For instance, if one desires extreme flexibility and softness of the coating system, one would select as a monomer the alkyl esters of an $\alpha,\beta$-ethylenically unsaturated acid or vinyl ether or vinyl esters containing more than 2 carbons in the aliphatic alkyl group. Extreme flexibility is a desired property in coil applications and softness is desired in textile applications. Examples of such monomers are ethyl acrylate, propyl acrylate, butyl acrylate, isobutyl acrylate 2-ethylhexyl acrylate, lauryl acrylate, and the like. Among the vinyl ethers that one can use are the methyl vinl ethers, butyl vinyl ethers, and the like. The vinyl esters included vinyl propionate, vinyl acetate, and the like. The moniomers, of course, have to be also selected based on their reactivity with each other. For most coating application on wood or metal, the sole use of a soft modifying monomer is not satisfactory since the films thus produced even if properly cross-linked are of soft and rubber consistency. The soft monomers in such a situation are, therefore, used in combination with hard monomers which give a stiffer polymer backbone. Examples of these hard monomers are styrene, vinyl toluene, t-butyl styrene, $\alpha$-methyl styrene, methyl methacrylate, methyl acrylate, vinyl acetate, vinyl chloride, vinyliene chloride and the like. These hard monomers may be used either singly or in combination with one another and for films of intermediate hardness, hard monomers or mixtures thereof may be used with one or more of the soft monomers. The vinyl emulsion polymers containing carboxyl group are prepared by polymerizing aidic polyomerizable monomers such as acrylic acid, methacrylic acidm crotonic acid, cinnamic acid, $\beta$-benzoyl acrylic acid, and poycarboxylic acids of the $\alpha,\beta$-ethylenically unsaturated class such as maleic, fumaric, itaconic, mesaconic, aconitic, and the halogenated acids such as halogenated maleic or more specifically, chloromaleic acid, and the like. However available, the anhydrides of these acids may be used. Thse acids and/or their anhydrides may be used either singly or in combination with one another. These acidic materials may be copolymerized or polymerized with one monomers which contain no carboxyl groups such as methyl, acrylate, ethyl acrylate, propyl acrylate, butyl acrylate, decyl acrylate, lauryl acrylate, methyl methacrylate, ethyl methacrylate, butyl methacrylate, heptyl methcrylate, decl methacrylate, propyl crotonate, butyl crotonate, nonyl crotonate, and the like.

If desired, one can modify the basic copolymers of the present invention by copolymerizing therewith one or more different polymerizable monomers but the amount of these differet monomers, depending on their characteristics should not be so great as to detract from the anionic chharacteristic of the acrylic polymer material. In this connection one could use such polymerizable compounds as styrene, ortho-, meta or para-alkyl styrenes such as the o-, m-, p-methyl, ethyl, propyl, and the butyl stryenes, 2,4-dimetyl styrene, 2,3-dimethyl styrene, 2,5-dimethyl styrene, vinyl nphthalene, acrylonitrile, methacrylonitrile, halo ring, or side chain styrenes such as $\alpha$-chloro styrene, ortho-, meta or para-chlorostyrene, 2,6-dichlorostyrene, 2,3-dichlorostyrne, 2,5-dichlorostyrne, or the alkyl side chain styrenes such as $\alpha$-methyl styrene, $\alpha$-ethyl styrene, and the like. Additionally, one can make use of such polymerizable vinyl monomers as acrylamide, methacrylamide, ethacrylamide, N-tertiarybutylacrylamide, and the like.

If it is desired to incorporate polymerizable monomer moieties containing an alcoholic hydroxy group into the basic copolymer chain one can produce an anionic polymeric material of this description by polymerizing the $\alpha,\beta$-ethylenically unsaturated carboxylic acid and the alkyl ester of $\alpha,\beta$-ethylenically unsaturated carboxylic acid with a polymerizable alkyl vinyl monomer which contains an alcoholic hydroxy ggroup such as the hydroxyl alkyl esters of $\alpha\beta$-ethylenically unsaturated monocarboxylic acid such as the hydroxyl alkyl esters of acrylic acid, methacrylic, ethacrylic acids and chloro as well as the other halo substituted acrylic acids. These ethers may either have a primary or a secondary hydroxyl group. Illustrative of the types of compounds that may be used as comonomers in preparing the anionic, polymeric material are 2-hydroxyethyl acrylate, 2-hydroxypropyl acrylate, 3-hydroxypropyl acrylate, 2-hydroxybutyl acrylate, 8-hydroxyoctyl acrylate, 2-hydroxyethylmethacrylate, 5-hydroxyhexylmethacrylate, 6-hyroxyoctlmethacrylate, 8-hydroxyoctylmethacrylate, 10-hyroxydeclemthacrylate 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another with other polymerizable vinyl monomers devoid of any alcoholic hydroxy group including those set forth hereinabove in the discussion of the carboxyl group containing monomer. Additonally, one can make use of other hydroxyl-containing polymerizable vinyl monomers such as methylolacrlamide, methylolmethacrylamide, and the like.

The compositions of the present nvention will contain as the third essential component (C) a compatible aminoplast cross-linking agent since the total compositions are particularly useful as coating compositions and are outstandingly attractive for this purpose since they can be used witout any solvent whatever, particularly without any organic solvent. The amount of the compatible aminoplast cross-linking agent used with components (A) and (B) can be varied between 10 and 85%, by weight, based on the total weight of the blend of the polyether polyol and the vinyl emulsion polymer solids. These cross-linking agents are reactive with the functional reactive groups of the emulsion polymer and with the hydroxyl groups of the polyether polyol. The preferred range of the aminoplast cross-linking agent is between 15 to about 50%, by weight, same basis.

The aminoplast cross-linking agents used in the present invention may be either alkylated or unalkylated. They should be alkylated when used in coating compositions but for other use such as in laminating operations, adhesives and molding compositions among others they are preferably unalkylated.

The alkylated aminoplast cross-linking agents can be prepared by reacting a urea with a aldehyde such as formaldehyde and then alkylating said urea-formaldeyde reaction product with a lower alkanol such as methanol, ethanol, propanol or butanol. In addition to urea per se, one could make use of ethyleneurea, thiourea, uron and the like. Additionally, one can make use of the amino-triazine aldehyde reaction products that have also been alkylated with comparable alkanols. In this connection, attention is directed to the U.S. Pat. No. 2,197,357 which shows a substantial plurality of amino-triazines reacted with aldehyde that are then alkylated by reaction with a substantial plurality of compounds containing an alcoholic hydroxy group. The above-mentioned U.S. patent is incorporated herein by reference to avoid unnecessary redundancy. The said patent discloses a plurality of guanimaines such as formoguanamine and acetoguanamine which can be used to form compatible alkylated aminoplast cross-linking agents. These cross-linking agents can be, and preferably are, monomeric. Illustrative of such a monomeric aminoplast cross-linking agent is the hexakis(methoxymethyl)melamine. This monomeric compound can be prepared by a plurality of different processes such as those shown in the U.S. Pat. No. 2,918,452; 2,998,410 and 2,998,411 all of which patents are incorporated herein by reference. Unmixed ethers of the polymethyl triazines can be used as well as mixed ethers such as the tetrakis(alkoxymethyl)benzoguanamines may be used which are disclosed in the U.S. Pat. No. 3,091,612 which patent is incorporated herein by reference. Mixed ethers of other triazines are disclosed in the U.S. Pat. No. 2,454,495 which is also incorporated herein by reference. A lengthy dissertation on fully mixed ethers of hxamethylol melamine is set forth in the U.S. Pat. No. 3,471,388 which patent is also incorporated herein by reference so as to avoid redundancy. The unalkylated melamine resins are shown in U.S. Pat. No. 2,260,239.

In addition to the urea family and the triazine family of alkylated aminoplast cross-linking agents, one may also use one of the aniline-formaldehyde reaction products, a plurality of which are available commercially. These aniline reaction products should be limited to use in those compositions in which darker colors are not objectionable.

In addition to using these cross-linking agents in the monomer state, one may use low polymers of these reaction products such as dimers, trimers, tretramers and the like. It is generally preferred to utilize a cross-linking agent that has an average molecular weight not greater than about 1,500.

If water dilutability of these cross-linking agents is desired, methanol is preferably used as the alkylating agent. These aminoplasts cross-linking agents may be used either singly or in combination with one another. In either case, the weight proportions remain the same.

The compositions of the presnt invention are coating compositions which may be used, as indicated hereinabove, without any organic solvent, which solvent may tend to pollute the atmosphere upon the evaporation of the organic solvent from the coating. When applied as an undiluted coating to a substrate such as an iron phosphate steel panel by spraying and thereafter baking, the three essential components react with one another to form a thermoset or cross-linked coating on the substrate. Because each of these components are frequently water soluble and almost invariably water disperisble, these compositions can be diluted with water to any selected solids content. If a clear coating is desired, the blend of the three essential components can be used directly on the substrate. However, pigmented coatings can be prepared by the use of conventionally available pigments such as titanium dioxide, iron oxide, red pigment and the like. These compositions are useful as coating compositions for metal, wood, plastic, textiles, paper, glass and the like. These compositions can be applied by spraying, dipping, roller coating or brushing techniques.

The vinyl emulsion polymers used in the present invention are commercially available from a plurality of sources in many different varieties. Some of these vinyl emulsion polymers are characterized as neat polymeric materials, i.e., containing nothing but th polymeric material dispersed in the aqueous medium generally with a neutralizing agent or surfactant. However, some of these vinyl emulsion polymers contain added reactants such as aminoplast cross-linking agents, and in using such latter materials in a composition with a further added aminoplast cross-linking agent, the amount of the cross-linking aget present in the vinyl emulsion polymer must be taken into account when the separately added cross-linking agent is later introduced.

These vinyl emulsion polymers can be readily prepard by well known processes such as that set forth hereinabove.

PROCESS FOR MAKING A VINYL EMULSION

Into a suitable reaction vessel equipped with thermometer, stirrer, nitrogen inlet and outlet tubes, reflux condenser and dropping funnel there is charged 63.72 parts of water, 1.20 parts of dioctyl sulfoussinate (a surfactant), 0.05 part of ammonium persulfate and 0.03 part of sodium bicarbonate. Into the dropping funnel, which is sealed off from the reaction vessel, there is introduced 22.75 parts of butl crylate, 1.50 parts of styrene and 1.75 parts of acrylic acid. The monomer charge is thoroughly mixed in the dropping funnel. The reaction vessel contents are stirred at 350 rpm and heated at 60°C. Thereupon 10% of the monomer mixture is added to the reaction vessel from the dropping funne. The heating is continued to 85°C. and a further addition of the monomers from the dropping funnel to the reaction vessel is started. The temperature is maintained between about 80° and 90°C. at all times in the reaction vessel. All of the monomer mix is added eventually in incremental amounts ovr a period of about one hour to one and one-half hours. At completion of the monomer addition the reaction vessel contents are heated at 90° to 95°C. for about 15 to 30 minutes or until no further refluxing is evident. The emulsion is cooled to cool temperature and strained through cheese cloth and is then ready to be added to the polyether polyol.

In order that the concept of the present invention may be more completely understoodm, the following examples are set forth in which all parts are parts by weight unless otherwise indicated. These examples are set forth primarily for the purposes of illustration and any specific enumeration of detail contained therein should not be ineterpreted as a limitation on the case except as indicated in the appended claims.

EXAMPLE 1

Into a suitable blending vessel, there is introduced 100 parts of a commercially available cross-linkable acrylic emulsion (60% solids) tetrapolymer of butyl acrylate styrene, acrylic acid, β-hydroxyethyl methacrylate containing 40% by weight of a methylated urea-formaldehyde resin as a cross-linking agent, 6 parts of polyether D and 6 parts of a methylated urea-formaldehyde resin (molar ratio U/F/Me: 1/2.4/1.9 respectivey) having an average M.W. of about 300. Films were drawn down from this coating composition on iron phosphate pretreated steel panels and baked a 150°C. for 30 minutes. The films were subjected to a plurality of tests.

EXAMPLE 2

Example 1 is repeated in all essential details except there is used 12 parts of the Polyether D and 12 parts of the methylated urea-formaldehyde resin.

EXAMPLE 3

Example 1 is repeated again in all essential detail except there is used 18 parts of the Polyether D and 18 parts pf the methylated urea-formaldehyde resin.

EXAMPLE 4

Example 1 is again repeated in all essential details except there is used 24 parts of the Polyethe D and 24 parts of the metylated urea-formaldehyde resin.

COMPARATIVE EXAMPLE 5

Example 1 is again repeated in all essential details except that the Polyether D and the methylated urea-formaldehyde resin are eac eliminated.

The tetrapolymer composition used in the examples 1–5 inclusive contains 60% total solids of tetrapolymer and cross-linking agent of which 60% is tetrapolymer per se or 36 parts and 40% is cross-linking agent or 24 hours.

The results of the tests to which the films of Examples 1–5 incusive were subjected are set forth hereinbelow in Table I.

TABLE I

|  | Example 1 | Example 2 | Example 3 | Example 4 | Comparative Example 5 |
|---|---|---|---|---|---|
| Film Thickness, mil | 0.8 | 0.7 | 0.7 | 0.7 | 1.0 |
| Knoop Hardness[1], KN-25 | 16 | 15.5 | 19 | 16 | 12 |
| Reverse Impact, in. lb. | >80 | >80 | >80 | >80 | >80 |
| Water Resistance (2 hrs. at 160°F.) | 10[2] | 10 | 10 | 10 | 15 minutes, softens |
| Appearance[3] | 7 | 8 | 10 | 10 | 5 |
| Adhesion on Metal[4] | 9 | 10 | 10 | 10 | 7 |
| Freeze-Thaw Stability (−20°C.) Cycle | >5 | >5 | >5 | >5 | 3 |

[1]Tukon Hardness
[2]No softening or blistering
[3]Appearance: 10 excellent, 8 good, 5 fair, 0 very poor
[4]Adhesion: 10 excellent, 8 good, 5 fair, 0 very poor

EXAMPLE 6

Into a suitable blending machine equipped as in Example 1 there is introduced 100 parts of the same acrylic emulsion composition used in Example 1, 30 parts of the Polyether D and 30 parts of the same methylated rea-formaldeyde resin. Films were drawn down on iron phosphate pretreated steep panels and were baked at 150°C. for 30 minutes. The films thus produced were subjected to a plurality of tests, results of which are shown in Table II.

EXAMPLE 7

Example 6 is repeated in all essential details except there is used only 80 parts of the same commercially available polymeric emulsion composition containing the methylated urea-formaldeyde cross-linking agent.

EXAMPLE 8

Example 6 is again repeated in all essential details except that there is used only 60 parts of the same polymeric emulsion composition.

EXAMPLE 9

Example 6 is again repeated in all essential details except that there is used only 40 parts of the same polymeric emulsion composition.

EXAMPLE 10

Example 6 is again repeated in all essential details except that there is used only 20 parts of the same polymeric emulsion composition.

COMPARATIVE EXAMPLE 11

Example 6 is repeated in all essential details except that the polymeric emulsion composition is omitted and there is used 50 parts of polyether D and 50 parts of the same methylated urea-formaldehyde cross-linking agent.

EXAMPLE 13

Example 12 is repeated in all essential details except that there is used only 25 parts of the same acrylic emulsion composition, 52.2 parts of polyether D and b 22.5 parts of hexa(methoxymethyl)melamine.

COMPARATIVE EXAMPLE 14

Example 12 is repeated in all essential details except that there is used 1000 parts of the same vinyl acrylic emulsion composition but the polyether D, the hexakis(methoxymethyl)melamine and the p-toluene sulfonic acid were omitted.

TABLE III

|  | Ex. 12 | Ex. 13 | Comparative Ex. 14 |
| --- | --- | --- | --- |
| Film Thickness, mil | 1.1 | 1.2 | 0.9 |
| Knoop Hardness | 7.5 | 8.0 | 12 |
| Reverse Impact, in. lb. | >80 | >80 | <10 |
| Hot Water Resistance (2 hrs. at 160°F.) | 10 | 10 | 4 |
|  | 10 | 10 | 5 |
| Appearance | 10 | 10 | 5 |
| Adhesion on Metal | 10 | 10 | 7 |
| Freeze-Thaw Stability (−20°C.) Cycle | >5 | >5 | 3 |

TABLE II

|  | Example 6 | Example 7 | Example 8 | Example 9 | Example 10 | Comparative Example 11 |
| --- | --- | --- | --- | --- | --- | --- |
| Film Thickness, mil | 0.7 | 1.0 | 0.9 | 1.0 | 1.0 | 0.9 |
| Knoop Hardness, KN-25 | 16 | 13 | 11.5 | 7.5 | 6 | 11 |
| Reverse Impact, in. lb. | >80 | >80 | >80 | >80 | >80 | >80 |
| Water Resistance (2 hrs. at 160°F.) | 10 | 10 | 10 | 10 | 10 | 15 | minutes soft |
| Appearance | 10 | 10 | 10 | 10 | 10 | 10 |
| Adhesion on Metal | 10 | 10 | 10 | 10 | 10 | 8 |
| Freeze-Thaw Stability (−20°C.) Cycle | >5 | >5 | >5 | >5 | >5 | >5 |

As shown in Table I, the addition of rather small quantities of the polyether polyol in conbination with the cross-linking agent as well as the vinyl emulsion polymer improves the water resistance, appearance, adhesion and freeze-thaw stabilit of the thermosetting acrylic emulsion. By the same token, Table II clearly indicated that the increase in the addition of the acrylic emulsion to the system improves adhesion and the water resistance of the novel film compositions of the present invention.

EXAMPLE 12

Into a suitable blending apparatus as is used in Example 1 there is introduced 75 parts (46% solid) of a commercialy avilable self-cross-linkable tetrapolymer emulsion contaning approximately 4 parts of methyl methacrylate, 47 parts of ethyl acrylate, 3 arts of acrylic acid and 3 parts of beta-hydroxyethyl methacrylate modified with 20 parts of a methylated melamine-formaldehyde resin, 17.5 parts of polyether D, 7.5 parts of hexakis(methoxymetyl)melamine and 1 parts of p-toluene sulfonic acid as a 20% solution in water. Films from this coating composition were prepared by drawing the liquid composition down on iron phosphate pretreated steel panels and baking the system for 20 minutes at 300°F. (150°C.). The panels thus produced were subjected to a plurality of tests, results of which are shown in Table III.

EXAMPLE 15

Into a suitable blending apparatus as is used in Example 1 there is introduced 80 parts of a 35% solds aqueous emulsion of an acrylic terpolymer (parts of butyl acrylate, 35 parts of styrene and 5 part of acrylic acid) with which there is blended 50 parts of polyether, D, 10 parts of a 20% aqueous solution of a commercially available maleic anhydride rosin adduct having an acid number of 200, used as a wetting agent, 90 parts or a rutile titanium dioxide pigment and 21.5 parts of hexakis(methoxymethyl)melamine. This blend is ground on a high speed dissolver and 0.4 part of dodecylbenzene sulfonic acid catalyst and 0.05 part of a silicone surfactant are added. The resulting paint composition has a non-volatile content of 63% and a viscosity of 70 seconds in a No. 4 Ford cup. Films of this coating composition were drawn down on iron phosphate pretreated cold rolled steel panels and baked for 20 minuts at 300°F. (150°C.). These films after baking were subjected to a plurality of tests. The results of these tests are set forth hereinbelow in Table IV.

TABLE IV

|  | Example 15 |
| --- | --- |
| Film Thickness, mil | 1.3 |
| Knoop Hardness | 8.3 |
| Color, Photovolt, blue | 90 |
| Gloss, 60° | 97 |
| Gloss, 20° | 95 |

TABLE IV-continued

|  | Example 15 |
| --- | --- |
| Reverse Impact, in. lb. | 50 |
| Steam-Resistance, 30 min. | 10 |
| Salt-Spray ASTM (B 117-64) 240 hrs. | 1-2 mm+/10++ |

+Creepage
++Blistering on face, 10 = no blister

COMPARATIVE EXAMPLE 16

Examples 15 is repeated inn all essentiakl details except that the polyether D was completely eliminated from the formulation. This formulation was completely flat and showed poor application characteristics. In order to obtain a useful comparison between a formulation with the polyol and one without the polyol, a manufacturers recommended formulation, to test the polyol-free, acrylic paint system, was used, namely 135 parts of a 35% solids emulsion of the sae acrylic polymer composition, as used in Example 15, was blended with 25 parts of water, 103 parts of isopropanol, 6.7 parts of hexakis(methoxymethyl)melamine, 1.2 parts of dimethylaminoethanol and 50 parts of a titanium dioxide nitrile pigment. The above ingredients are blended and ground in a ball mill. The resulting paint has a viscosity of 22 seconds when measured on a No. 4 Ford cup on a non-volatile content of 32.8%. The paint thus produced was drawn down on iron phospate steel panels and baked for 20 minuts at 300°F. (150°C.). The films thus produced were subjected to a plurality of tests, the esults of hich are shown hereinbelow in Table V:

TABLE V

|  | Comparative Example 16 |
| --- | --- |
| Film Thickness, mil | 0.8 |
| Knoop Hardness | 12 |
| Color, Photovolt, blue | 86 |
| Gloss, 60° | 88 |
| Gloss, 20° | 78 |
| Reverse Impact, in. lb. | <10 |
| Steam-Resistance, 30 min. | 10 |
| Salt-Spray ASTM (B 117-64) 240 hrs. | 3 mm/8 |

The functional reactive groups contained in the vinyl emulsion polymer used in the present invention have been discussed in significant detail hereinabove. It has been pointed out, for instance, that the amide groups are commonly derived from acrylamide and substituted acrylamides. The reactive keto groups can be derived from monomrs such as diacetone acrylamide or methylvinylketone, ethylvinylketone and the like. The methylol functonal groups may be obtained by utilizing methylol acrylamide, methylol diacetone acrylamide and the like. The alkoxymethyl reactive functonal groups can be obtaned from alkoxumethyl acrylamide or alkoxmethyl methacrylamide and the like. The alkoy group in the alkoxymethyl reactive grop can obtain rom bout 1 to about 8 carbon atpms although in most instance it is preferred that the alkxy group contain from 1 to 4 carbon atoms. Most of the oil-in-water vinyl emulsion polymers that are used in the compositions of the present invention do not contain only a sngle type of reactive functional group. Instead, most of tese vinyl eulsion polymers will conain at least two distinct types of reactive groups. It is common to use, in these acrylic emlsions, at least 1 to 24% of acrylic acid and the like as a comonomer in order to increse the pigment compatibility of the polymeric material. If the vinyl emulsion polymer is to be used with a methylated melamine formaldeydereaction product, as the cross-linking agent, this carboxyl functonlity is sually sufficient to achieve satisfactory performance. higher cross-linked systems can be obtained by raising the acid content of the vinyl eulsion to about 5-7%. With melamine resin cross-lining agents, hydroxyl groups are a normally preferred reactive functonal groups because they give films with better detergent and water-resistance. With the urea based cross-linking agents, it is essential to use vinyl eulsin polymers conaining hydroxyl reactive groups in order to obtan the best performance. In this connection it should be noted that the urea based cross-linking agents have a strong tendency to self-condense if they are used with vinyl emulsion polymers containing only carboxyl functional groups. Vinyl emulsion polymers containing keto group monomers, especially the diacetone acrylamide when used in the components of the present invention have been found to be particularly useful for coatings which require improved adhesion on wod substrates. Methylol groups or alkoxymethyl groups have such a functionality that they can be used for self cross-linking type of emulsion in which eventually lesser amounts of the aminoplast cross-linking agents may be used. The amount o the methylol groups that on can incorporate into a vinyl emulsion polymer is usually limited and levels larger an abou 3 t 5% of a monomer such as metylol acrylamide will redue the stability of the emulsion whereas the alkoxymethyl groups can be readily incorporated into the vinyl emulsion polymer without danger of premature gellation.

Normally these vinyl emulsion polymers are prepared in water with the aid of an external emulsifier, such as the nonionic, anionic or cationic emulsifiers. The nonionic or anionic emulsifiers are preferred for most applications. The most commonly used nonionic emulsifiers are the polyethylene glycol ethers or esters of nonylphenol, octylphenol, lauryl alcohol, dodecyl meraptan, luric acid, stearic acid, or the polyethlene glyol - polpyroylene glycol block copolymers. Illustrative of the types of anionic surfactants or emulsifiers which ay be used in preparing the vinyl emulsion polymers used in the present invention are the dialkylsulfo sucinates, alkyl sulfonate, alkyl aryl sulfonate, lauric acid, stearic acid, rosin and the like. One could utilize colloidal dispersants such as polyvinyl alcohol, hydroxyethyl cellulose and the like in order to obtain stable emulsions.

the vinyl emulsion polymer, if not obtained from a commercial source, can be readily prepared by a conventional polymerization technique which is normally conducted at temperatures below 100°C. utilizing either inorganic or organic peroxies. Itf a redox system is utilized, the polymerization can be conducted at room temperature. The vinyl emulsion polymers obtained by this commonly known process of polymerization will have a molecular weight of between about 50,000, if chain transfer agents are being used, to several million in the absence of a chain transfer agent. The average molecular weight of the emulsion polymer, therefore, can range from about 50,000 to about 5,000,000 but it is preferred to use a vinyl emulsion polymer having a molecular weight between about 200,000 and 2,000,000. From the standpoint of optimum mechanical performance, the high molecular weight polymers are preferred.

Depending on the level and type of emulsifier, the type of monomers used and the polymerization conditions used, the emulsion can be extremely low particle sizes, almost appearing to be a solution or on the other hand quite large particles of polymer can be used. The preferred particle size range is between about 600 A to about 50,000 A or expressed differently between about 0.06 $\mu$ and about 5 $\mu$.

In combining the polyether polyol, the vinyl emulsion polymer and the amino cross-linking agent, one needs to exercise certain precautions. For instance, some emulsion systems are sensitive to the additive of polyether polyol and/or cross-linking agents in which event it is advantageous to blend the polyol and the cross-linking agent before hand followed by the reduction of the solids of this blend with deionized water to about 50 to 80% solids and then adding this mixtuure under agitation slowly and in incremental portions to the emulsion. After the blend has been prepared, it is sometimes advisable to adjust the pH of the system to about 7 to 9 in order to obtain good stability of the blend.

The curing speed of the total mixture can be regulated over a wide range of baking conditions. When compared with conventional water-soluble resins which contain large levels of amine to achieve stability as well as solubility in water, the emulsion polymer, polyether polyol, cross-linking agent blend requies very small levels of amine or, for that matter, no amine at all. This low level of amine or the complete absence of amine makes the preparation of very fast, low-temperature curing vinyl emulsion polymer/polyether polyol/cross-linking agent systems possible.

Some emulsion systems have shown stability than others w hen combined with th polyether polyol. It has been found that when high levels of poloyl are being used with a vinyl emulsion polymer, which polymer is very soluble in the polyol, the polyol will diffuse from the water in the emulsion particle and thereby reduce the stability of the system. To overcome this shortcoming and thereby achieve optimum stability with high levels of polyol, it is, therefore, desirable, and, in fact in some instances necessary, to select a vinyl emulsion polymer which has comparatively limited solubility at room temperature in the polyether polyol but good solubility in the polyether polyol under the conditions of the baking process. This can be accomplished by the addition of small quantities of difunctional monomers such as methylene bis acrylamide, ethyl glycol dimethacrylate and the like in order to achieve a slightly cross-linked emulsion polymer particle which reduces the solubility of the polyol in the vinyl emulsion polymer and thereby increases the stability of the vinyl emulsion polymer/polyol blend.

The compositions of the present invention, when used as coating compositions, can be completely free of any dye or pigments particularly when clear transparent coatings are desired. Generally, however, color coating compositions are preferred and pigments are added into the polyol by the usual grinding techniques such as mixing in a ball mill. During the pigment blending one may optionally add surfactants or water-soluble resins. The pigment paste thu produced can ten be readily blended with the aminoplast cross-linking agent which mixture is then added to the vinyl emulsion polymer. The coating of the polyol obtained on the pigment during the grinding process enhances the gloss of the resulting emulsion film as contrasted with the unmodified vinyl emulsion polymer. The addition of the polyether polyol further reduces the tendency of the pigmented systm to settle.

The vinyl emulsion polymer/polyether polyol/aminoplast cross-linking agent blend when drawn down as a film on a suitable substrate can be baked at commercially used baking temperatures varying between about 150°F. (65°C.) to 400°F. (204°C.) for baking cycles varying between about one-half minutes to about 60 minuts. The addition of conventional acidic catalysts will shorten the baking cycle or reduce the baking temperature. Caution should be exercised in the premature addition of the acid catalyst to the coating composition especially in large quantities even at low temperatures because such curing systems will then have limited shelf life and as a consequence, the addition of the catalyst should be accomplished just immediately prior to use.

The addition of the polyol to the vinyl emulsion polymer increase the application solids of the emulsion. The polyol becomes a part of the continuous phase of the emulsion and in order to achieve optimum stability of the emulsion polymer/polyol blend, it is desirable hat the polyol remains in the water, i.e., in the continuous phase. If larger amounts of the polyether polyol migrate into the emulsion poymer particles, the emulsion particles will swell and the emulsion will display a tendency to coagulate. The preferred solubility of th polyol in the aqueos phase can be achieved by proper matching of the slubility parameter* of the poloyl, water and eulsion particles (* see Journal of Paint Technlogy, Vol. 39, 505, February 1967). The ideal situation would be that all of the polyether polyol is dissolved in the water and no polyol is dissolved in the emulsion polymer particles. For all practical purposes polyether polyol/vinyl emulsion polymer systems, one will observe a particular solubility of the polyol in the vnyl emulsion polymer particles. During the baking process the ideal polyether polyol should become completely solble in the vinyl /emulsion polymer and act as a coalescence aid an coslvent. Diurng the baking process, reaction of the fnctional groups of the polyol and the emulsion particles with th aminoplast cross-linking agent take place producing a transparent, clear and compatible film. If the polyol is not completely soluble or ony partly soluble in the vinyl emulsion polymer the baked, cross-linked films may be hazy and incompatible. For most applications, this appearance deficiency is not desirable. The solubility of the polyether polyol in the vinyl enulsion polymer particles or in the water phase, i.e., the continuous phase, can be changed very readily by modifying the hydrophobic/hydrophilic balance of the polyol and by changing the monomeric composition of the vinyl emulsion polymer. Sometimes the water level in the polyther polyol/vinyl emulsion polymer blend is too high for certain applications in which event the polyether polyol/vinyl emulsion polymer blend can be vacuum stripped to remove some or all of the water. All of the water an be removed only if the blend contains about 50 volume percent of the polyol and the vinyl emulsion polymer particles provide the remainder. If a higher amount of the vinyl emulsion polymer particle is present in the blend, the self-crowding of the emulsion will cause coagulation. In most cases the presence of 5% to 25% of water in the blend increases the stability. The best wa to reove water from the polyol/emulsion blend is at slightly elevated temperatures and under a high vacuum, i.e., low absolute pressure.

Throughout the specification and in the claims the hydrophobic/hydrophilic balance of the polyester polyol resins used in the present invention is discussed in significant detail, The water solubility of a polyether polyol resin can be achieved by the introduction of a variety of grops into a polymer backbone. The most common method of accomplishing this is the inroduction of carboxyl groups. The amine or alkali salt of these carboxyl groups containing monomers are water soluble or water dispersible. Even very hydrophobic water dispsersble polymeric material by the introduction of arboxyl groups followed by the formation of the aine salt. Thi approach, although commrcially used, has certain disadvantages. One disadvantage resides in the fact that an amine is required to obtain solubility and the amine is or may be toxic, is or may be a pollutant and is expensive. In an aminoplast cross-linking agents. The reaction between aminoplast cross-linking agents and the carboxyl groups eliminates the water sensitivity of the cured film. A second approach to achieve water solubility is the introduction of hydrophilic nonionic grups such as polyethylene glycol groups. This approach gives a water soluble or water dispersible product without the use of an amine. However, one disadvantage to his approach is that even after reaction wit the aminoplast cross-linking agent, the water sensitivity sites remain in the film and, therefore, the cross-linked structure gives poor resistance properties and, therefore, are frequently of no commrcial interest. I have discovered that the disadvantage of ater sensitive polyethylene glycol grups in a molecle can be overcome by caeful balancin byropholic and hydrophili groups on the molecule. By using thse arefully balanced hydrophobic/hydrophilic polyols one can achieve water sluble or water dispersible materials hich after cross-linking with an aminoplast cross-linking agent give films with excellent water resistance. It has been found that the hydrophobic/hydrophilic balance of the polyols used in the compositions of the present invention can be expressed in the form of HLB value or weight percent hydrophobic/hydrophilic range. The HLB value is an often used tool in expressing hydrophilic-lipophilic (hydrophobic) balance of a nonionic surfactant molecule. A simple method of calculating the HLB value of a molecule is contained in the literature and is calculated by using the following equation:

HLB Value

The HLB value (hydrophilic-lipophilic balance) has been found to be a very useful tool in selecting polyethers and predicting their ater solubility for this application. Polyethers with useful performance were found to have HLB values from 3.5 to 18. The higher value gives better water dilution but poorer water resistance.

The HLB value of a polyether with known structure can be calculated using the following equation.

HLB = (hydrophilic) − (hydrophobic) +7

| Contributing Group | | | |
|---|---|---|---|
| Hydrophilic | | Hydrophobic | |
| Ester | 2.4 | —C— | |
| Carboxyl | 2.1 | —CH— | 0.475 |
| Hydroxyl | 1.9 | —CH$_2$— | |
| Ether | 1.3 | —CH$_3$— | |

-continued

—(CH$_2$—CH$_2$—O) 0.33

(—CH$_2$—CH$_2$—CH$_2$—O—)— 0.15
         CH$_3$
         |
—(CH$_2$—C—O—)—     0.15

The HLB value of the polyols useful in the compositions of the present invention has to be between about 3.5 and about 18. A simpler method which was sufficiently accurate for the present purposes is the calculation of weight percent of the hydrophiic and hydrophobic grops in a molecule. The hydrphobic groups in the polyol compositions used in my invention are hydrocarbon or predominantely hydrocarbon contianing another atom such as oxygen so long as the ratio of the carbon/oxygen is larger than 2/1. The hydrophilic groups in the polyols used in the compositions of the present invention are derived from ethylene oxide as polyethylene glycol. Although another group can contribute to the hydrophilic character of the molecule, polyethylene glycol groups are the only groups that are considered to be of importance in the present invention. The usual method of obtaining such a ydropholic polyethylene glycol group on a molecule is by the reaction of a reactive hydrogen containing compound with ethylene oxide. the preferred hydrophobic grops in the polyether polyol used in the present invntion ar driven from aromatic or cyclooliphatic compounds such as bisphenol A, bisphenol F, hydrogenated bisphenl A and F, phenol-formaldehyde novolak resins or xylene formaldehyde resins. Propylene oxide or/and higher $\alpha$-olefine oxides also contribute to the hydrolhobic nature of the polyether polyol molecule.

The molecular weight of the vinyl emulsion polymers of the present invention have been set foth hereinabove as overal and preferred range. These molecular weight determinations are matched on polymers having a molecular weight of about 10,000 or less by use of a vapor pressure osmometer. When the molecular weight of the vinyl polymer is in excess of about 10,000, the molecular weight determination is made by measuring the viscosity on a capillary viscosimeter. It has been idicated hereinabove that one may between about 3 to about 98% of the polyether polyol resin and correspondingly from about 97 to abot 2% by weight of the aqueous vinyl emulsion polyer as defined. It is preferred to use between about 20 to about 80% of the polyol resin and correspondingly from about 80 to about 20% of the aqueous vinyl emulsion polymer. It is desired to use between about 10 to about 85%, by weight, based on the total weight, of the mixture of the polyether polyol resin and the aqueous vinyl emulsion polymer, of a compatible aminoplast cross-linking agent having an average molecular weight not greater than about 1,500. It is preferred to use between about 15 to about 50%, by weight, of said cross-linking agent, same basis.

The water-dilutable polyether polyol resins used in the present invention may be normaly liquid, i.e., liquid at atmospheric pressue and at about room temperature, i.e., about 20°-25°C. Howeve, since the aminoplast cross-linking agents used in the compositions of the present invention are in some instance solids and in other instances liqid, use of normally solid water-dilutable polyether polyol resins can be made since theyy can be dissolved or dispersed in the compatible aminoplast cross-linking agent. Additionally, normally solid water-dilutable polyether polyol resins that have a softening or melting point of 30°, 40°, 50°C. and higher may be warmed to their melting point and a solid compatible aminoplast cross-linking aget may be dissolved therein and upon cooling to room temperature the mixture remain liquid. Additionally, these same normally solid polyol resins may be heated to their melting temperature and a nornally liquid compatible minoplast cross-linking agent may be dispersed therein with thorough mixuing and upon cooling to room teperature, the mixture remains liquids. Still further, tbese normaaly solid polyol resins may be dilutd with a small quantity of water, since the are water dilutable, to form a high solis solution of the polyol in water which solution may then be blended with a solid or a liquid compatible aminoplast cross-linking agent of the class described hereind. Still further, one could take a normally solid water-dilutable polyether polyol resin and a normaly solid compatible aminoplast cross-linking agent and the two solids can be physicaly mixed to form an eutetic mixture which remains liquid at room temperature.

I claim:

1. A composition of matter cmprising a blend of (A), from bout 3 to about 98%, by weight, of a water-dilutable, non-ionic polether polyol resin having only carbon, hydrogen and oxyen atoms and optonally halogen atoms, having an aveage mlecular weight between about 300 and about 2,000, having at least two alcoholic hydroxy groups, having from bout 80 to about 10%, by weight, of ydropholic moieties derived a least in part from aromatic or cycloaliphatic matrials and correspondingly from bout 29 to about 90%, by weight, of hydrophilic moieties consisting of —($CH_2$—$CH_2$—O—) units; (B), correspondingly from about 97% to about 2%, by weight, solis basis, of an aqueous vinyl emulsion polymer having a particle sie between about 600 A and 50,000 A, contaning from about 1% to about 10%, by weight, of functional reactive groups selected from the group consisting of hydroxy, carboxyl, amide keto, metylol an alkoxymethyl groups and (C) from about 20% to abot 85%, by weight, based on the total weight of (A and (B), of a compatible aminoplast cross-linking agent having an average molecular weight not greater than about 1,500.

2. A composition according to claim 1 in which the cross-linking agetis alkylated with a $C_1$-$C_4$ alkanol.

3. A composition according to claim 1 in wich (A) is present in an amount varying from about 20% to about 80% and (B) is present correspondingly in an amount varying from about 80% to about 20%.

4. A composition according to claim 1 in which (R) is a reaction product of 4,4'-metylene diphenol, propylene oxide and ethylene oxide.

5. A composition accordng to claim 1 in which (A) is a reaction product of 4,4'-isopropylene diphenol and ethylene oxide.

6. A composition according to claim 1 in which (C) is an alkylated $C_1$-$C_4$ urea formaldehyde cross-linking agent.

7. A composition according to claim 1 in which (C) is an alkylated $C_1$-$C_4$ 1 melamine-formaldehyde cross-linking agent.

8. A composition according to claim 1 in which (C) is an alkylated C1-$C_4$ benzoguanamine-formaldehyde cross-linking agent.

9. A composition acording to claim 1 in which the aqueous vinyl emulsion polymer is a terpolymer of butyl acrylate, styrene and acrylic acid.

10. A composition according to claim 1 in which the aqueous vinyl emulsion polymer is a tetrapolymer of methyl methacrylate, ethyl acrylate, acrylic aid and β-hydroxyethyl methacrylate.

11. A composition according to claim 1 that contains (C) from 15 to 50% by weight based on the total weight of (A) and (B) of a compatible aminoplast cross-linking agent having an average molecular weight not greater than 1,500.

* * * * *

UNITED STATES PATENT OFFICE
CERTIFICATE OF CORRECTION

Patent No. 3,959,202            Dated May 25, 1976

Inventor(s) WERNER JOSEF BLANK            Page 1 of 11

It is certified that error appears in the above-identified patent and that said Letters Patent are hereby corrected as shown below:

Col. 1, line 16. Change "esinous" to -- resinous --.
Col. 1, line 24. Change "dissculties" to -- difficulties --.
Col. 1, line 32. Change "fromm" to -- from --.
Col. 1, line 36. Change "boling" to -- boiling --.
Col. 1, line 39. Change "seriou" to -- serious --.
Col. 2, line 15. Change "abot" to -- about --.

Col. 2, line 38. Change "comonent" to -- component --.

Col. 2, line 48. Change "polyhyric" to -- polyhydric --.
Col. 2, line 55. Change "bispheonol to -- bisphenol --.
Col. 2, line 56. Change "diphenl" to -- diphenol --.
Col. 2, line 57. Change "dihydroxdiphenyldimethylmethane" to -- dihydroxydiphenyldimethylmethane --.
Col. 3, line 4. Change "lkyl" to -- alkyl --.
Col. 3, line 15. After "the" add -- like. --.

Col. 3, line 20. Change " dihydoxydi-" to -- dihydroxydi- --.
Col. 3, line 28. Change "foth" to -- forth --.
Col. 3, line 35. Change "immpart" to -- impart --.
Col. 3, line 47. Change "Certan" to -- Certain --.
Col. 3, line 55. Change "mold" to -- mols --.
Col. 3, line 60. Change "moietis" to -- moieties --.
Col. 3, line 66. Change "b3" to -- 3. --.
Col. 4, line 1. Change "hydropholic" to -- hydrophobic --.
Col. 4, line 4. Change "polyethe" to -- polyether --.
Col. 4, line 43. Change "mls" to -- mols --.
Col. 4, line 44. Change "hs" to -- has --.
Col. 4, line 46. Change "hydropholic" to -- hydrophilic --.
Col. 4, line 46. Change "2.2%" to -- 52.2% --.

UNITED STATES PATENT OFFICE
CERTIFICATE OF CORRECTION

Patent No. 3,959,202  Dated May 25, 1976

Inventor(s) WERNER JOSEF BLANK  Page 2 of 11

It is certified that error appears in the above-identified patent and that said Letters Patent are hereby corrected as shown below:

Col. 4, line 46.  Change "hydropholic" to -- hydrophobic --.
Col. 4, line 49.  Change "polether" to -- polyether --.
Col. 4, line 55.  Change "averge" to -- average --.
Col. 4, line 62.  Change "will e" to -- will be --.
Col. 5, line 3.   Change "such s" to -- such as --.
Col. 5, line 5.   Change "th" to -- the --.
Col. 5, line 8.   Change "hydropholic" to -- hydrophobic --.
Col. 5, line 14.  Change "hydropholic" to -- hydrophobic --.
Col. 5, line 33.  Change "deriatves" to -- derivatives --.

Col. 5, line 38.  Change "contaning" to -- containing --.
Col. 5, line 41.  Change "alkoxymethl" to -- alkoxymethyl --.
Col. 5, line 45.  Change "ster" to -- ester --.
Col. 5, line 47.  Change "stryenes" to -- styrenes --.
Col. 5, line 63.  Change "monomrs" to -- monomers --.
Col. 5, line 64.  Change "oil-inwater" to -- oil-in-water --.
Col. 6, line 14.  Change "vinl" to -- vinyl --.
Col. 6, line 16.  Change "moniomers," to -- monomers, --.
Col. 6, line 27.  Change "vinyliene" to -- vinylidene --.
Col. 6, line 33.  Change "aidic polyomeriza-" to -- acidic polymeriza- --.
Col. 6, line 34.  Change "acidm" to -- acid --.
Col. 6, line 36.  Change "poycarboxylic" to -- polycarboxylic --.
Col. 6, line 40.  Change "However" to -- Wherever --.
Col. 6, line 41.  Change "Thse" to -- These --.
Col. 6, line 44.  Change "one" to -- other --.
Col. 6, line 45.  Change "methyl," to -- methyl --.
Col. 6, line 48.  Change "methcrylate, decl" to -- methacrylate, decyl --.
Col. 6, line 54.  Change "differet" to -- different --.
Col. 6, line 56.  Change "chharacteristic" to -- characteristics --

UNITED STATES PATENT OFFICE
CERTIFICATE OF CORRECTION

Patent No. 3,959,202　　　　　　　　　Dated May 25, 1976

Inventor(s) WERNER JOSEF BLANK　　　　　　　　Page 3 of 11

It is certified that error appears in the above-identified patent and that said Letters Patent are hereby corrected as shown below:

Col. 6, line 60.　Change "stryenes," to -- styrenes, --.
Col. 6, line 60.　Change "2,4-dimetyl" to -- 2,4-dimethyl --.
Col. 6, line 61.　Change "nphthalene," to -- naphthalene, --.
Col. 6, line 64.　Change "2,6-" to -- 2,4- --.
Col. 6, line 64.　Change "2,3-dichlorostyrne" to -- 2,3-dichlorostyrene --.
Col. 6, line 65.　Change "2,5-dichlorostyrne" to -- 2,5-dichlorostyrene --.
Col. 7, line 9.　Take out "alkyl".
Col. 7, line 10.　Change "ggroup" to -- group --.
Col. 7, line 11.　Change "αβ-" to -- α,β- --.
Col. 7, line 22.　Change "6-hydroxyoctlmethacrylate," to -- 6-hydroxyoctylmethacrylate, --.
Col. 7, line 23.　Change "10-hydroxydeclemthacrylate" to -- 10-hydroxydecylmethacrylate, --.
Col. 7, line 34.　Change "thylolacrlamide," to -- thylolacrylamide --.
Col. 7, line 36.　Change "nvention" to -- invention --.
Col. 7, line 41.　Change "witout" to -- without --.
Col. 8, line 6.　Change "guanimaines" to -- guanamines --.
Col. 8, line 24.　Change "hxamethylol" to -- hexamethylol --.
Col. 8, line 38.　Change "tretramers" to -- tetramers --.
Col. 8, line 47.　Change "presnt" to -- present --.
Col. 8, line 58.　Change "disperisble," to -- dispersible, --.
Col. 9, line 5.　Change "th" to -- the --.
Col. 9, line 12.　Change "aget" to -- agent --.
Col. 9, line 17.　Change "pard" to -- pared --.
Col. 9, line 24.　Change "sulfoussinate" to -- sulfosuccinate --.
Col. 9, line 28.　Change "butl crylate" to -- butyl acrylate --.
Col. 9, line 28.　Change "1.50" to -- 10.50 --.
Col. 9, line 34.　Change "funne" to -- funnel --.
Col. 9, line 39.　Change "ovr" to -- over --.
Col. 9, line 58.　Change "to cool" to -- to room --.

UNITED STATES PATENT OFFICE
CERTIFICATE OF CORRECTION

Patent No. 3,959,202　　　　　　　　　Dated May 25, 1976

Inventor(s) WERNER JOSEF BLANK

It is certified that error appears in the above-identified patent and that said Letters Patent are hereby corrected as shown below:

Col. 9, line 62.　Change "understoodm," to -- understood, --.
Col. 9, line 67.　Change "ineterpreted" to -- interpreted --.
Col. 10, line 6.　Change "acrylate" to -- acrylate, --.
Col. 10, line 10.　Change "respectivey" to -- respectively --.
Col. 10, line 25.　Change "pf" to -- of --.
Col. 10, line 29.　Change "Polyethe" to -- Polyether --.
Col. 10, line 30.　Change "metylated" to -- methylated --.
Col. 10, line 35.　Change "eac" to -- each --.
Col. 10, line 42.　Change "incusive" to -- inclusive --.
Col. 10, line 64.　Change "rea" to -- urea --.
Col. 11, line 6.　Change "urea-formaldeyde" to -- urea-formaldehyde --.
Col. 11, line 42.　Change "conbination" to -- combination --.
Col. 11, line 45.　Change "stabilit" to -- stability --.
Col. 11, line 55.　Change "commercialy avilable" to -- commercially available --.
Col. 11, line 56.　Change "contaning" to -- containing --.
Col. 11, line 56.　Change "4 parts" to -- 47 parts --.
Col. 11, line 57.　Change "3 arts" to -- 3 parts --.
Col. 11, line 61.　Change "hexakis(methoxymetyl)" to -- hexakis(methoxymethyl) --.
Col. 11, line 62.　Change "parts" to -- part --.
Col. 12, line 5.　After "and" take out "b".
Col. 12, line 11.　Change "1000" to -- 100 --.
Col. 12, line 43.　Change "solds" to -- solids --.
Col. 12, line 45.　Change "5 part" to -- 5 parts --.
Col. 12, line 49.　Change "or" to -- of --.
Col. 12, line 58.　Change "minuts" to -- minutes --.
Col. 13, line 11.　Change "inn all essentiakl" to -- in all essential --.
Col. 13, line 11.　Change "Examples 15" to -- Example 15 --.
Col. 13, line 19.　Change "sae" to -- same --.
Col. 13, line 24.　Change "nitrile" to -- rutile --.

UNITED STATES PATENT OFFICE
CERTIFICATE OF CORRECTION

Patent No. 3,959,202　　　　　　　　　Dated May 25, 1976

Inventor(s) WERNER JOSEF BLANK　　　　　　Page 5 of 11

It is certified that error appears in the above-identified patent and that said Letters Patent are hereby corrected as shown below:

Col. 13, line 29.　Change "minuts" to -- minutes --.
Col. 13, line 31.　Change "esults of hich" to -- results of which --.
Col. 13, line 51.　Change "monomrs" to -- monomers --.
Col. 13, line 53.　Change "functonal" to -- functional --.
Col. 13, line 55.　Change "functonal" to -- functional --.
Col. 13, line 56.　Change "obtaned from alkoxumethyl" to -- obtained from alkoxymethyl --.
Col. 13, line 57.　Change "alkoxmethyl" to -- alkoxymethyl --.
Col. 13, line 57.　Change "alkoy" to -- alkoxy --.
Col. 13, line 58.　Change "grop" to -- group --.
Col. 13, line 58.　Change "obtain" to -- contain --.
Col. 13, line 59.　Change "rom bout" to -- from about --.
Col. 13, line 59.　Change "atpms" to -- atoms --.
Col. 13, line 60.　Change "instance" to -- instances --.
Col. 13, line 60.　Change "alkxy" to -- alkoxy --.
Col. 13, line 63.　Change "sngle" to -- single --.
Col. 13, line 64.　Change "of tese" to -- of these --.
Col. 13, line 65.　Change "eulsion" to -- emulsion --.
Col. 13, line 65.　Change "conain" to -- contain --.
Col. 13, line 67.　Change "emlsions," to -- emulsions, --.
Col. 13, line 67.　Change "1 to 24%" to -- 1% to 2% --.
Col. 13, line 68.　Change "increse" to -- increase --.
Col. 14, line 3.　Change "formaldeyderaction" to -- formaldehyde reaction --.
Col. 14, line 4.　Change "functonlity is sually" to -- functionality is usually --.
Col. 14, line 5.　Change "higher" to -- Higher --.
Col. 14, line 6.　Change "an" to -- can --.
Col. 14, line 7.　Change "eulsion" to -- emulsion --.
Col. 14, line 8.　Change "cross-lining" to -- cross-linking --.

UNITED STATES PATENT OFFICE
CERTIFICATE OF CORRECTION

Patent No. 3,959,202                    Dated May 25, 1976

Inventor(s) WERNER JOSEF BLANK

It is certified that error appears in the above-identified patent and that said Letters Patent are hereby corrected as shown below:

Col. 14, line 9.    Change "functonal" to -- functional --.
Col. 14, line 12.   Change "eulsin" to -- emulsion --.
Col. 14, line 12.   Change "conaining" to -- containing --.
Col. 14, line 13.   Change "obtan" to -- obtain --.
Col. 14, line 20.   Change "components" to -- compositions --.
Col. 14, line 22.   Change "wod" to -- wood --.
Col. 14, line 26.   Change "o" to -- of --.
Col. 14, line 27.   Change "on" to -- one --.
Col. 14, line 28.   Change "larger an" to -- larger than --.
Col. 14, line 29.   Change "abou 3 t 5%" to -- about 3% to 5% --.
Col. 14, line 29.   Change "metylol" to -- methylol --.
Col. 14, line 30.   Change "redue" to -- reduce --.
Col. 14, line 40.   Change "merap-" to -- mercap- --.
Col. 14, line 41.   Change "luric acid" to -- lauric acid --.
Col. 14, line 41.   Change "polyethlene glyol - to -- polyethylene glycol
Col. 14, line 42.   Change "polpyroylene" to -- polypropylene --.
Col. 14, line 43.   Change "ay" to -- may --.
Col. 14, line 45.   Change "sucinates," to -- succinates, --.
Col. 14, line 51.   Change "the" to -- The --.
Col. 14, line 55.   Change "peroxies" to -- peroxides --.
Col. 14, line 55.   Change "Itf a" to -- If a --.

Col. 15, line 17.   Change "mixtuure" to -- mixture --.
Col. 15, line 28.   Change "requies" to -- requires --.
Col. 15, line 34.   Change "have shown stability" to -- have shown poorer stability --.
Col. 15, line 35.   Change "w hen" to -- when --.
Col. 15, line 35.   Change "th" to -- the --.
Col. 15, line 36.   Change "poloyl" to -- polyol --.
Col. 15, line 63.   Change "thu" to -- thus --.
Col. 15, line 63.   Change "ten" to -- then --.

UNITED STATES PATENT OFFICE
CERTIFICATE OF CORRECTION

Patent No. 3,959,202　　　　　　　　　　Dated May 25, 1976

Inventor(s) WERNER JOSEF BLANK

It is certified that error appears in the above-identified patent and that said Letters Patent are hereby corrected as shown below:

Col. 16, line 3.　　Change "systm" to -- system --.
Col. 16, line 10.　Change "minuts" to -- minutes --.
Col. 16, line 23.　Change "hat" to -- that --.
Col. 16, line 26.　Change "poymer" to -- polymer --.
Col. 16, line 28.　Change "th polyol" to -- the polyol --.
Col. 16, line 29.　Change "aqueos" to -- aqueous --.
Col. 16, line 30.　Change "slubility" to -- solubility --.
Col. 16, line 30.　Change "poloyl," to -- polyol --.
Col. 16, line 30.　Change "eul-" to -- emul- --.
Col. 16, line 31.　Change "technlogy," to -- technology, --.
Col. 16, line 37.　Change "vnyl" to -- vinyl --.
Col. 16, line 39.　Change "solble" to -- soluble --.
Col. 16, line 41.　Change "an coslvent." to -- and cosolvent. --.
Col. 16, line 41.　Change "Diurng" to -- During --.
Col. 16, line 42.　Change "fnctional" to -- functional --.
Col. 16, line 43.　Change "th" to -- the --.
Col. 16, line 43.　Change "take" to -- takes --.
Col. 16, line 45.　Change "ony" to -- only --.
Col. 16, line 50.　Change "enulsion" to -- emulsion --.
Col. 16, line 55.　Change "polyther" to -- polyether --.
Col. 16, line 59.　Change "an" to -- can --.
Col. 16, line 66.　Change "wa to reove" to -- way to remove --.
Col. 17, line 7.　 Change "grops" to -- groups --.
Col. 17, line 8.　 Change "inroduc-" to -- introduc- --.
Col. 17, line 11.　After "hydrophobic" insert -- polymers can be converted into water soluble or at least --.
Col. 17, line 12.　Change "dispsersble" to -- dispersible --.
Col. 17, line 13.　Change "arboxyl" to -- carboxyl --.
Col. 17, line 14.　Change "aine salt." to -- amine salt. --.
Col. 17, line 14.　Change "Thi" to -- this --.
Col. 17, line 14.　Change "commrcially" to -- commercially --.
Col. 17, line 18.　Change "cross-linking" to -- cross-linked --.
Col. 17, line 18.　After "cross-linked" insert -- coating

UNITED STATES PATENT OFFICE
CERTIFICATE OF CORRECTION

Patent No. 3,959,202   Dated May 25, 1976

Inventor(s) WERNER JOSEF BLANK   Page 8 of 11

It is certified that error appears in the above-identified patent and that said Letters Patent are hereby corrected as shown below:

composition these carboxyl groups can react with the aminoplast cross-linking agents. --.
Col. 17, line 19.   Take out "agents."
Col. 17, line 23.   Change "grups" to -- groups --.
Col. 17, line 27.   Change "wit" to -- with --.
Col. 17, line 30.   Change "commr-" to -- commer- --.
Col. 17, line 32.   Change "ater" to -- water --.
Col. 17, line 32.   Change "grups in a molecle" to -- groups in a molecule --.
Col. 17, line 33.   Change "caeful balancin byropholic" to -- careful balancing hydrophobic --.
Col. 17, line 34.   Change "hydrophili" to -- hydrophilic --.
Col. 17, line 34.   Change "thse are-" to -- these care- --.
Col. 17, line 36.   Change "sluble" to -- soluble --.
Col. 17, line 37.   Change "hich" to -- which --.
Col. 17, line 53.   Change "ater" to -- water --.
Col. 18, line 13.   Change "hydrophiic" to -- hydrophilic --.
Col. 18, line 14.   Change "grops" to -- groups --.
Col. 18, line 14.   Change "hydrphobic" to -- hydrophobic --.
Col. 18, line 16.   Change "predominantely" to -- predominately --.
Col. 18, line 16.   Change "contianing" to -- containing --.
Col. 18, line 25.   Change "ydropholic" to -- hydrophilic --.
Col. 18, line 28.   Change "grops" to -- groups --.
Col. 18, line 29.   Change "invntion ar driven" to -- invention are derived --.
Col. 18, line 31.   Change "bisphenl A" to -- bisphenol A --.
Col. 18, line 34.   Change "hydrolhobic" to -- hydrophobic --.
Col. 18, line 37.   Change "foth" to -- forth --.
Col. 18, line 38.   Change "overal" to -- overall --.
Col. 18, line 38.   Change "range" to -- ranges --.
Col. 18, line 44.   Change "idi" to -- indi- --.
Col. 18, line 45.   After "may" insert -- use --.
Col. 18, line 45.   Change "3" to -- 3% --.

UNITED STATES PATENT OFFICE
CERTIFICATE OF CORRECTION

Patent No. 3,959,202  Dated May 25, 1976

Inventor(s) WERNER JOSEF BLANK  Page 9 of 11

It is certified that error appears in the above-identified patent and that said Letters Patent are hereby corrected as shown below:

| | | |
|---|---|---|
| Col. 18, line 47. | Change "abot" to | -- about --. |
| Col. 18, line 48. | Change "polyer" to | -- polymer --. |
| Col. 18, line 49. | Change "20" to | -- 20% --. |
| Col. 18, line 50. | Change "80" to | -- 80% --. |
| Col. 18, line 52. | Change "10" to | -- 10% --. |
| Col. 18, line 58. | Change "15" to | -- 15% --. |
| Col. 18, line 61. | Change "normaly" to | -- normally --. |
| Col. 18, line 62. | Change "pressue" to | -- pressure --. |
| Col. 18, line 63. | Change "Howeve," to | -- However, --. |
| Col. 18, line 65. | Change "instance" to | -- instances --. |
| Col. 18, line 66. | Change "liqid," to | -- liquid, --. |
| Col. 18, line 67. | Change "theyy" to | -- they --. |
| Col. 19, line 5. | Change "aget" to | -- agent --. |
| Col. 19, line 7. | Change "remain" to | -- remains --. |
| Col. 19, line 9. | Change "nornally" to | -- normally --. |
| Col. 19, line 9. | Change "minoplast" to | -- aminoplast --. |
| Col. 19, line 11. | Change "mixuing" to | -- mixing --. |
| Col. 19, line 11. | Change "teperature," to | -- temperature, --. |
| Col. 19, line 12. | Change "liquids." to | -- liquid. --. |
| Col. 19, line 12. | Change "tbese normaaly" to | -- these normally --. |
| Col. 19, line 13. | Change "dilutd" to | -- diluted --. |
| Col. 19, line 14. | Change "since the are" to | -- since they are --. |
| Col. 19, line 14. | Change "solis" to | -- solids --. |
| Col. 19, line 17. | Change "hereind." to | -- herein. --. |
| Col. 19, line 19. | Change "normaly" to | -- normally --. |
| Col. 19, line 21. | Change "physicaly" to | -- physically --. |
| Col. 19, line 21. | Change "eutetic" to | -- eutectic --. |
| Col. 19, line 25. | Change "cmprising" to | -- comprising --. |
| Col. 19, line 26. | Change "bout" to | -- about --. |
| Col. 19, line 26. | Change "3" to | -- 3% --. |
| Col. 19, line 27. | Change "polether" to | -- polyether --. |
| Col. 19, line 28. | Change "oxyen" to | -- oxygen --. |
| Col. 19, line 28. | Change "optonally" to | -- optionally --. |

UNITED STATES PATENT OFFICE
CERTIFICATE OF CORRECTION

Patent No. 3,959,202　　　　　　　　Dated May 25, 1976

Inventor(s) WERNER JOSEF BLANK

It is certified that error appears in the above-identified patent and that said Letters Patent are hereby corrected as shown below:

Col. 19, line 29.　Change "aveage mlecular" to -- average molecular --.
Col. 19, line 31.　Change "bout 80" to -- about 80% --.
Col. 19, line 32.　Change "ydropholic" to -- hydrophobic --.
Col. 19, line 32.　Change "a least" to -- at least --.
Col. 19, line 33.　Change "matrials" to -- materials --.
Col. 19, line 34.　Change "bout 29" to -- about 20% --.
Col. 19, line 37.　Change "solis" to -- solids --.
Col. 19, line 38.　Change "sie" to -- size --.

Col. 20, line 2.　Change "amide" to -- amide, --.
Col. 20, line 2.　Change "an" to -- and --.
Col. 20, line 3.　Change "20%" to -- 10% --.
Col. 20, line 3.　Change "abot" to -- about --.
Col. 20, line 8.　Change "agetis" to -- agent --.
Col. 20, line 9.　Change "wich" to -- which --.
Col. 20, line 13.　Change "(R)" to -- (A) --.
Col. 20, line 14.　Change "4,4'-metylene" to -- 4,4'-methylene --.
Col. 20, line 16.　Change "accordng" to -- according --.
Col. 20, line 17.　Change "4,4'-isopropylene" to -- 4,4'-isopropylidene --.
Col. 20, line 23.　After "$C_1-C_4$" take out "1"
Col. 20, line 26.　Change "$Cl-C_4$" to -- $C_1-C_4$ --.
Col. 20, line 28.　Change "acording" to -- according --.
Col. 20, line 33.　Change "aid" to -- acid --.

UNITED STATES PATENT OFFICE
CERTIFICATE OF CORRECTION

Patent No. 3,959,202      Dated May 25, 1976

Inventor(s) WERNER JOSEF BLANK      Page 11 of 11

It is certified that error appears in the above-identified patent and that said Letters Patent are hereby corrected as shown below:

Column 20, line 26. Change "15" to -- 15% --.

Signed and Sealed this

Thirty-first Day of May 1977

[SEAL]

Attest:

RUTH C. MASON
*Attesting Officer*

C. MARSHALL DANN
*Commissioner of Patents and Trademarks*